July 10, 1951     W. J. BLOOMER     2,560,071
FIXED CENTRIFUGAL DEVICE
Filed Nov. 12, 1948     2 Sheets-Sheet 1
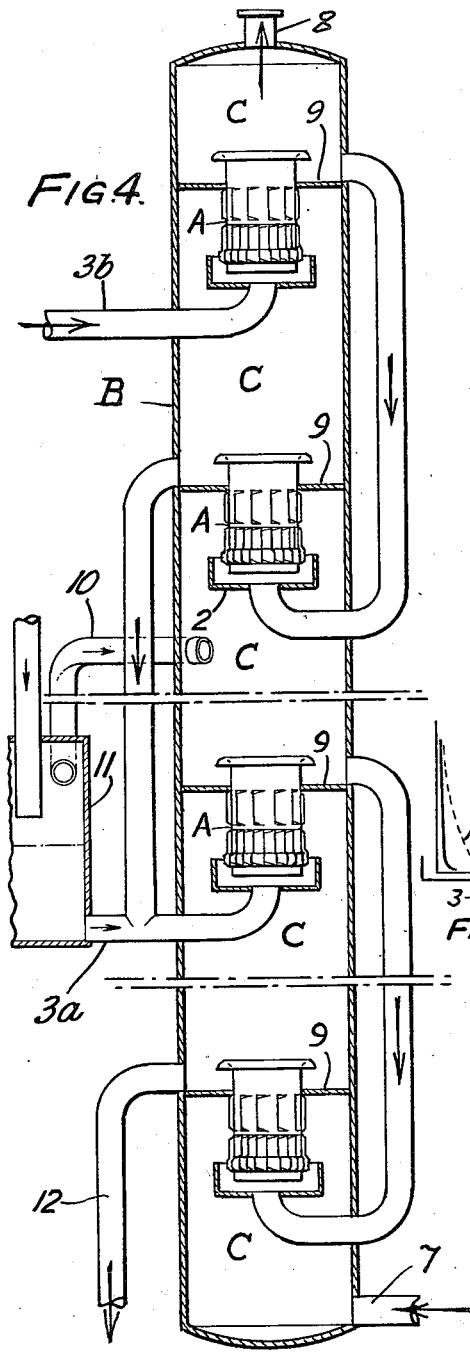
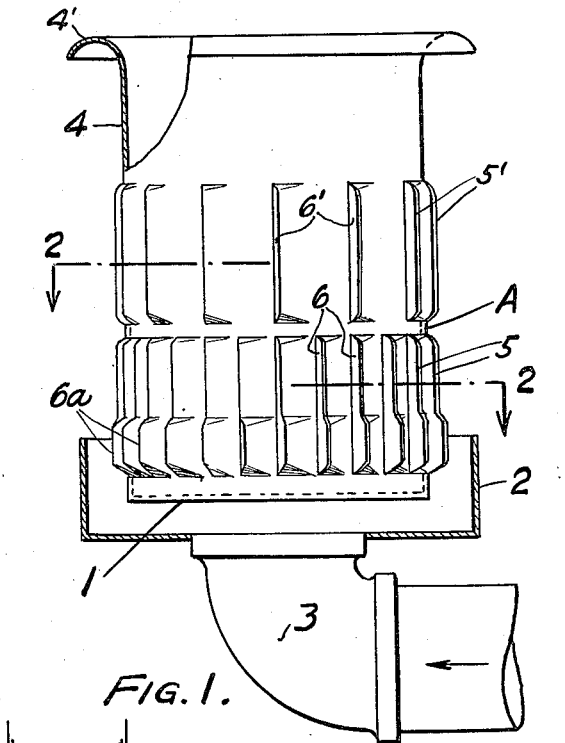
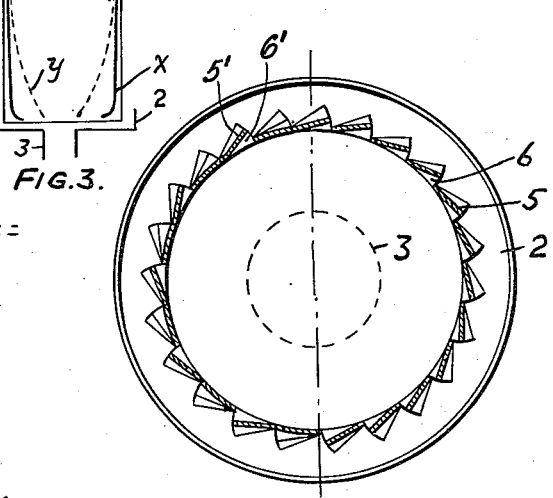
INVENTOR
Ward J. Bloomer
BY Nathaniel Ely
ATTORNEYS.

July 10, 1951 W. J. BLOOMER 2,560,071
FIXED CENTRIFUGAL DEVICE
Filed Nov. 12, 1948 2 Sheets-Sheet 2

INVENTOR.
Ward J. Bloomer
BY Nathaniel Ely
ATTORNEY

Patented July 10, 1951

2,560,071

UNITED STATES PATENT OFFICE 2,560,071

FIXED CENTRIFUGAL DEVICE

Ward J. Bloomer, Westfield, N. J., assignor, by mesne assignments, to Centrifix Corporation, Cleveland, Ohio, a corporation of Ohio Application November 12, 1948, Serial No. 59,718

5 Claims. (Cl. 261—79)

This invention relates to an improvement in fixed centrifugal devices of the type heretofore variously used for contacting gases and liquids to effect concentration, fractionation, or the like, for removing entrained liquid from gases, and the like, and for other purposes and, more particularly, of the general type embodied in the apparatus illustrated and described in Patent No. 2,189,491 to Hawley. It is a modification of and improvement on the invention described in my copending application Serial No. 59,719, filed November 12, 1948.

Fixed centrifugal devices of the type under consideration comprise essentially an element termed a tuyère, of cylindrical form having a closed end and an open end and presenting one or more circumferential series of substantially tangential blades extending along and forming the wall of the element and defining narrow intermediate radially spaced openings for the passage of a gas or vapor therethrough. In operation, for contacting, for example, a liquid with a gas, the liquid is fed to the gas path entering the tuyère adjacent the closed end and the gas is introduced through the narrow pasages between the tangential blades at a high velocity. The gas thus enters the tuyère tangentially and hence within the tuyères travels circumferentially and longitudinally of the axis thereof, picking up and dispersing the liquid in fine particles within its whirling stream or vortex. The particles of liquid in the whirling stream of gas are next consolidated in an imperforate ring and thence discharged from the tuyère, the liquid being centrifugally ejected away from the gas.

In the operation of such a device for contacting a liquid and a gas, it has heretofore been recognized that the entering gas, due to resolution of all forces involved, forms within the tuyère a vortex or envelope, having the shape of a semi-parabola, about an area of low pressure or partial vacuum axially of the tuyère. Further, it is known that the useful working range of such a device requires a vapor rate greater than that at which the envelope would close at the entering or closed end of the tuyère in order to avoid central entrainment of liquid.

Now, it has been observed that the maximum efficient contact between a gas and a liquid in such a device can be achieved by straightening out the portion of the wall of the envelope adjacent the closed end of the tuyère to eliminate its lower small diameter portion, so that the envelope as a whole will approach a cylindrical form; and it is the object of this invention to provide a fixed centrifugal device, or tuyère, so constructed that the entering gas will form an envelope approaching a completely cylindrical shape.

More specifically, it is an object of the invention to provide differential openings in a cylindrical tuyère whereby the largest amount of gas or vapor enters adjacent the closed end of the tuyère and a progressively lesser amount enters adjacent the open end of the tuyère.

Having now indicated in a general way the nature and purpose of this invention, I will proceed to a detailed description of preferred forms of embodiment thereof with reference to the accompanying drawings, in which:

Figure 1 is a side view, partly in section and partly broken away, of a fixed centrifugal device embodying the principles of this invention.

Figure 2 is a sectional view on line 2—2, Figure 1.

Figure 3 is a diagrammatic view indicating the change in shape of the envelope formed by a gas entering the device shown in Figure 1.

Figure 4 is a view, partly in vertical section, showing adaptation of the device shown in Figure 1 to an apparatus for fractionating petroleum.

Figure 5:
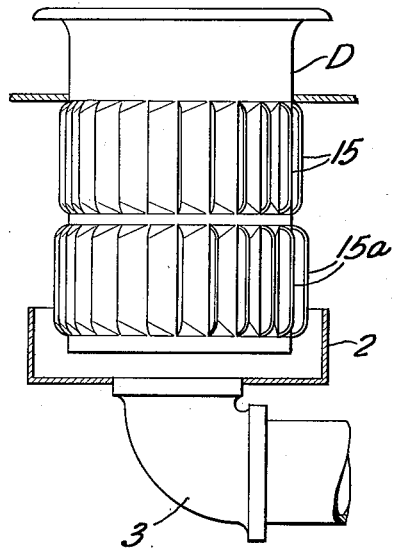
Figures 5, 6 and 7 are vertical sections of modified forms of construction.

Referring more particularly to Figures 1 and 2, A indicates a tuyère of cylindrical form and fabricated from any suitable material, as, for example, sheet metal. The tuyère has an imperforate bottom 1 and is supported in any suitable manner in a pan 2, into which leads a pipe 3, through which a liquid is supplied to the pan. The top of the tuyère is open and discharges into an imperforate ring 4, provided with an outwardly curved lip 4' at its top.

The lower portion of the tuyère A presents a circumferential series of closely spaced tangential blades 5 forming narrow passages 6 between them and which extend vertically from adjacent the bottom 1. The blades 5 may be readily formed by slitting and bending from the wall of the tuyère and the lower end portions 6a of the passages 6 within the pan 2 may be enlarged by bending out the lower end portions of the blades 5, as shown.

Above the series of blades 5 is a second circumferential series of tangential blades 5' forming passages 6' between them. The blades 5', however, are less in number than are the blades 5, so that the aggregate area of the passages formed by the blades 5' is less than the aggregate area of the passages formed by the blades 5. By way of example, but not by way of limitation, the aggregate area of the passages formed by the blades 5' may be about one-half of the aggregate area of the passages formed by the blades 5.

Referring now more particularly to Figure 4, B indicates a fractionating tower, provided with a vapor inlet 7 and a vapor outlet 8 and divided, by means of decks 9, into a plurality of fractionating units C.

Each of the several decks 9 supports one or more tuyères A, and vapors passing up through the column pass up through each tuyère. A liquid to be fractionated enters through the liquid supply pipe 3a and vapors may also enter the column at 10 as from separator 11.

Assuming now that petroleum is to be fractionated in the tower B, in the usual manner, and a reflux liquid is supplied through liquid line 3b, the vapors rising through the column will pick up the liquid at each feed pan 2 as it enters the tuyère tangentially through the passages formed by the blades 5 and the blades 5'.

The gas entering the several tuyères, in passing up the tower from deck to deck, assumes a whirling motion therein and picks up the liquid entering the tuyère through the lower ends of the passages formed by blades 5. The liquid in the several pans will tend to cool the gas to effect condensation of the desired fraction in the several fractionating units C with the continuous enrichment of heavier boiling materials drawn off through line 12, and the removal of heavy ends from the overhead vapors at 8.

By virtue of the greater aggregate area of the passages formed by the blades 5 in comparison with the aggregate area of the passages formed by the blades 5', a substantially larger amount of vapor will enter the lower portion of each of the tuyères A adjacent the closed end than will enter the intermediate portion of the tuyères adjacent to the imperforate portion, with the result that the vapor envelope formed within the tuyère will be a shape approaching cylindrical, as indicated in Figure 3, by the full line $x$, in comparison with the semi-parabolic shape indicated in Figure 3 by the dotted line $y$ heretofore obtained.

As will now be observed, the fixed centrifugal device or tuyère according to this invention is so constructed as to provide for the admission of vapor in differential amount in the vertical extension of the tuyère.

More specifically, the device is so constructed that the lower portion of the device, for example, the lower half, receives more vapor than does the upper portion, for example, twice as much, with the result that the lower portion of the vapor envelope, heretofore of relatively small diameter in comparison with the upper portion, is straightened out so that the envelope as a whole assumes a substantially cylindrical shape and affords maximum efficient contact with a liquid introduced to the tuyère.

There are two particular advantages to the differential blade opening. The principal advantage is that a better contact is established between the liquid and the gas or vapor because of the longer path of high centrifugal force resulting from the supply of the larger amounts of gas or vapor adjacent the closed end of the tuyère. In other words, a more intimate contact is accomplished sooner where the vapors and liquids are contacted under conditions to establish a relatively shallow envelope.

A second advantage which is of major importance is the advantage of greater range of operation. As previously mentioned, it is found that unless there is a minimum vapor velocity through the blades the parabola tends to close above the base of the tuyère which will tend to cause a central eruption and discharge of liquid. It will be apparent that if the normal path of the whirling envelope of gas and liquid is as indicated by the line $x$, it is possible under temporary or emergency conditions to operate with a vapor velocity so reduced as to reach the line $y$ and no objectionable result would be obtained. Ordinarily, I find that a minimum vapor velocity of at least 30 feet per second is required to establish any substantial liquid pick-up and, as described in my copending application, using a 9" tuyère with an 11" feed pan, and having 71 blades with an aggregate blade area of .416 square foot, the blade openings being $\frac{3}{32}$", I was able to pick up 1400 gallons of water per hour with 1200 cubic feet per minute of air. In such case the velocity was 32.1 feet per second.

In a practical application, it may be possible to increase the contact efficiency as, for example, from 70% to 80% or in a system in which water is used for cooling air, it would be possible to obtain a closer approach of the air and water outlet temperatures. Many other specific advantages will appear to those skilled in the art.

With reference to Figure 5, the tuyère, generally indicated at D, is also of the cylindrical type having the closed end portion surrounded by a pan 2 to which liquid is supplied by conduit 3. In this case, a multiple series of blades, generally indicated at 15 and 15a, are also provided but there are the same number of blades in both series. However, the depth of opening is such that the total vapor inlet area for the blades 15 is less than for the blades 15a. This is accomplished, as one practical expedient by making the depth of blades 15 approximately one half the depth of the blades 15a. This also serves to give the differential blade opening as contemplated by Figure 1 and may be easier to construct in the shop.

Figure 6:
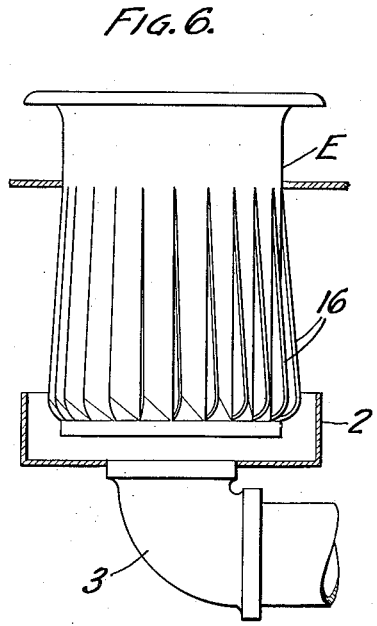

In Figure 6, the tuyère E is of single blade series construction and the tuyère blades 16 are formed with a uniformly increasing opening along their length having the greatest opening at the bottom adjacent the closed end of the tuyère and extending to the imperforate ring adjacent the open end of the tuyère. As in the prior constructions the areas on one side of a central transverse plane are substantially greater than on the other side and are preferably double. This differential blade construction has the advantage of permitting a particularly low velocity of vapor with some liquid pick-up.

Figure 7:
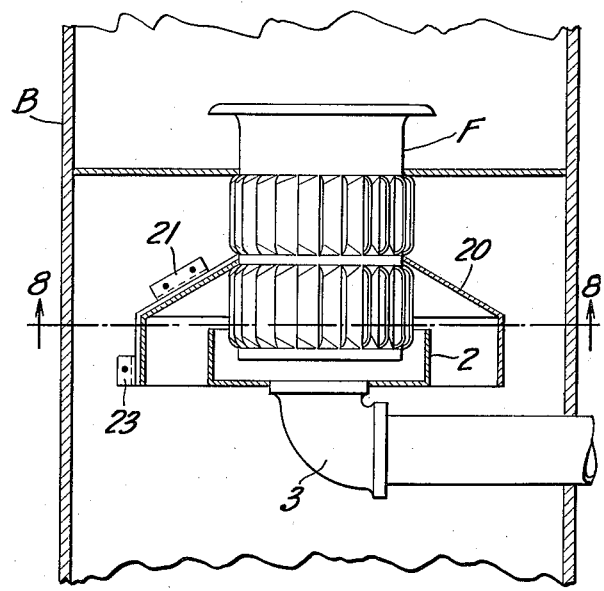
Figure 8:
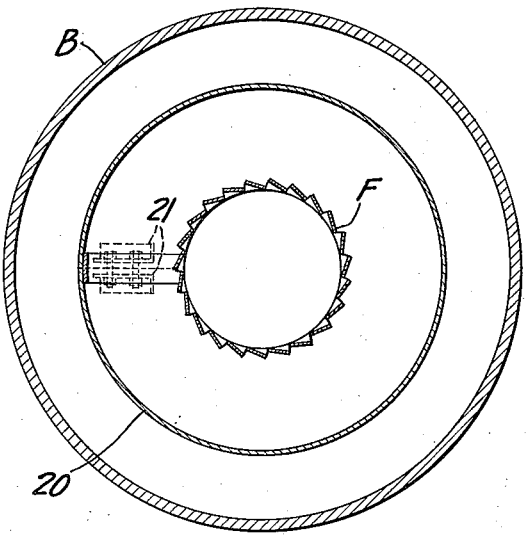
Figure 8 is a horizontal section on the line 8—8 of Figure 7.

Figures 7 and 8 show a modified form of tuyère F which may have either a single or multiple series of blades but, in this case, the tuyère is provided with an encircling skirt or annular baffle generally indicated at 20 and suitably held together by the clips 21 and 23. The baffle is adapted to engage the circumference of the tuyère F and by proportioning the diameter of the cylindrical opening with respect to the diameter of the column B, it is possible to force various proportions of gas into respective portions of the tuyère. For example, if the concentric area formed by the internal diameter of baffle 20 and the outer diameter of pan 2 is twice the concentric area formed by the internal diameter of tower B and the outer diameter of baffle 20, it will be obvious that approximately ⅔ of the vapors can be passed thru the lower half of the tuyère.

With such a construction, it will be apparent that it is possible to adjust the relative gas flow by shifting the baffle along the longitudinal length of the tuyère so that any predetermined arrangement can be obtained. The use of the baffle may be combined with differential openings in the tuyère as previously described.

While I have shown and described preferred forms of embodiment of my invention, I am aware that modifications may be made thereto and I therefore desire a broad interpretation of my invention within the scope and spirit of the description herein and of the claims appended hereinafter.

What I claim and desire to protect by Letters Patent is:

1. In combination with a closed chamber, a fixed centrifugal device comprising a cylindrical tuyère, a closure for one end of said tuyère, the other end being open, and a series of tangentially extending blades disposed circumferentially of said tuyère and forming between them a series of passages extending from adjacent said end closure for the entry of a vapor into said tuyère, a liquid reservoir having a side wall surrounding the closed end portion of said tuyère, means for feeding a liquid to said reservoir, and means for supplying a vapor to said tuyère through said passages and over the liquid in said reservoir to entrain the liquid therein, and form a vortical column of vapor and liquid discharging from the open end of the tuyère, said passages being proportioned to afford entry of vapor to said tuyère in differential amount in the areas respectively adjacent to said end closure and remote therefrom, the aggregate areas on one side of a central transverse plane of the tuyère being substantially greater than the other.

2. A fixed centrifugal device as claimed in claim 1 in which the aggregate area of the tuyère openings adjacent said end closure are approximately twice the aggregate area of the tuyère openings on the other side of the central transverse plane.

3. A fixed centrifugal device as claimed in claim 1 in which the effective area of the vapor passages changes substantially uniformly from end to end.

4. A fixed centrifugal device comprising a cylindrical tuyère, a closure for an end of said tuyère, a series of tangentially extending blades disposed circumferentially of said tuyère adjacent to said end closure and forming between them a series of vertically extending passages for the entry of a vapor into said tuyère and a second series of tangentially extending blades disposed circumferentially of said tuyère remote from said end closure and forming between them a second series of vertically extending passages for the entry of a vapor into said tuyère, said first series of passages being greater in number than and collectively affording entry for a greater amount of vapor than said second series of passages.

5. The combination as claimed in claim 1 in which said tuyère has two series of tangentially extending blades, the series of tangentially extending blades adjacent the end closure being deeper in cross section and collectively affording entry for a greater amount of vapor than said second series of passages.

WARD J. BLOOMER.

REFERENCES CITED

The following references are of record in the file of this patent:

UNITED STATES PATENTS

| Number | Name | Date |
|---|---|---|
| 1,751,324 | Green | Mar. 18, 1930 |
| 2,075,344 | Hawley | Mar. 30, 1937 |
| 2,189,491 | Hawley | Feb. 6, 1940 |